United States Patent
Chan et al.

(10) Patent No.: US 10,693,901 B1
(45) Date of Patent: Jun. 23, 2020

(54) TECHNIQUES FOR APPLICATION SECURITY

(71) Applicant: JPMorgan Chase Bank, N.A., New York, NY (US)

(72) Inventors: Jacky C. T. Chan, Ho Man Tin (HK); Boris T. H. So, Ma On Shan (HK); Ainsley G. Rattray, Jersey CIty, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 371 days.

(21) Appl. No.: 15/337,723

(22) Filed: Oct. 28, 2016

Related U.S. Application Data

(60) Provisional application No. 62/247,433, filed on Oct. 28, 2015, provisional application No. 62/356,031, filed on Jun. 29, 2016.

(51) Int. Cl.
*H04L 29/06* (2006.01)
*G06Q 30/06* (2012.01)
*H04L 29/08* (2006.01)

(52) U.S. Cl.
CPC ...... *H04L 63/1433* (2013.01); *H04L 63/0263* (2013.01); *H04L 63/1458* (2013.01); *H04L 67/02* (2013.01)

(58) Field of Classification Search
CPC .......... H04L 29/06904; H04L 63/0263; H04L 63/1433; H04L 63/1458; H04L 67/02; H04N 21/44236
USPC .......................................................... 726/25
See application file for complete search history.

(56) References Cited

U.S. PATENT DOCUMENTS

| | | | | |
|---|---|---|---|---|
| 9,854,030 | B2* | 12/2017 | Bhat | H04L 67/10 |
| 2002/0083341 | A1* | 6/2002 | Feuerstein | G06F 21/55 |
| | | | | 726/25 |
| 2003/0037236 | A1* | 2/2003 | Simon | G06F 21/316 |
| | | | | 713/161 |
| 2004/0073811 | A1* | 4/2004 | Sanin | H04L 63/0263 |
| | | | | 726/13 |
| 2005/0108147 | A1* | 5/2005 | Scroope | G06Q 30/06 |
| | | | | 705/37 |
| 2005/0188221 | A1* | 8/2005 | Motsinger | G06F 21/55 |
| | | | | 726/5 |
| 2006/0282897 | A1* | 12/2006 | Sima | G06F 11/3664 |
| | | | | 726/25 |
| 2007/0022119 | A1* | 1/2007 | Roy | H04L 63/0245 |

(Continued)

*Primary Examiner* — Shanto Abedin
(74) *Attorney, Agent, or Firm* — Greenblum & Bernstein, P.L.C.

(57) ABSTRACT

Software developers previously dealt with each security threat by incorporating a corresponding set of code lines into individual web applications, which required significant amount of time and code lines for each security threat and the resulting code was hard to maintain or modify. One aspect of the present invention addresses common security concerns in a standardized and centralized approach. All user requests for web applications are centralized to a single input and validated by a Web Security Filter. Selected layers of validation filters (e.g., ESAPI and AntiSamy) could be sequentially applied to the user requests, and those filters can be individually maintained/modified as discrete modules. Not only is this centralized, holistic approach to application security effective against a majority of malicious attacks, it is also saves a lot of time and costs in code development and maintenance.

12 Claims, 3 Drawing Sheets

(56) References Cited

U.S. PATENT DOCUMENTS

| | | | |
|---|---|---|---|
| 2007/0083928 A1* | 4/2007 | Mattsson | G06F 21/552 726/22 |
| 2007/0199050 A1* | 8/2007 | Meier | G06F 21/577 726/4 |
| 2009/0044271 A1* | 2/2009 | Benameur | G06F 21/31 726/22 |
| 2009/0119769 A1* | 5/2009 | Ross | G06F 21/55 726/13 |
| 2009/0265777 A1* | 10/2009 | Scott | H04L 63/1441 726/11 |
| 2010/0332837 A1* | 12/2010 | Osterwalder | H04L 63/0245 713/172 |
| 2010/0333167 A1* | 12/2010 | Luo | H04L 63/1441 726/1 |
| 2012/0260344 A1* | 10/2012 | Maor | G06F 11/3688 726/25 |
| 2012/0304249 A1* | 11/2012 | Luo | G06F 21/554 726/1 |
| 2013/0179988 A1* | 7/2013 | Bekker | H04L 63/0823 726/27 |
| 2013/0238589 A1* | 9/2013 | Yarramreddy | G06F 17/3087 707/709 |
| 2014/0081793 A1* | 3/2014 | Hoffberg | G06Q 30/0207 705/26.3 |
| 2014/0222568 A1* | 8/2014 | Weitzman | G06Q 30/0261 705/14.57 |
| 2014/0250521 A1* | 9/2014 | Gallardo | G06F 21/70 726/16 |
| 2014/0317681 A1* | 10/2014 | Shende | H04L 63/10 726/1 |
| 2015/0200955 A1* | 7/2015 | Martin | G06F 21/562 726/23 |
| 2016/0337384 A1* | 11/2016 | Jansson | G06F 17/30876 |
| 2017/0026353 A1* | 1/2017 | Chen | H04L 63/061 |
| 2017/0104722 A1* | 4/2017 | Parla | H04L 63/0281 |

\* cited by examiner

TECHNIQUES FOR APPLICATION SECURITY

CROSS-REFERENCE TO RELATED APPLICATIONS

This patent application claims the benefit of U.S. Provisional Application Nos. 62/247,433 and 62/356,031, filed Oct. 28, 2015 and Jun. 29, 2016 respectively, both of which are incorporated herein by reference in their entireties.

FIELD OF THE INVENTION

Embodiments of the present invention disclosed herein relate generally to the fields of computer networks and software development. More particularly, the present invention relates to improved techniques for application security, such as in an enterprise network.

BACKGROUND OF THE INVENTION

Organizations, especially large enterprises (e.g., financial institutions), have been making significant, ongoing investments to keep their computer networks safe from security threats such as unauthorized access and malicious attacks. For each type of known threat, software developers usually adopt a corresponding set of countermeasures and code them into the particular web applications which need protection against that particular type of threat. Thus, each individual web application has to be modified manually to incorporate hundreds or even thousands of lines of additional code in defense against each security threat, and the resulting application software must be tested after each modification. This process apparently has to be repeated for every application whenever a new or mutated threat emerges in order to keep the protection updated.

For a large organization running a significant number of web applications on server clusters, it can become very time-consuming and costly for IT personnel to maintain and update all the applications with the proper defense mechanisms. Such conventional approach to application security is also prone to human errors and could leave security gaps in application defenses, for example, due to inconsistencies among security-related code in different applications, methods, functions, or individual lines of code.

Deficiencies also exist with respect to prior approaches with respect to specific areas of security.

Improper input validation and output encoding are also top vulnerabilities of existing web applications leading to XSS, SQL injection, command injection, resource injection, path manipulation, and so on. Although static and dynamic scan can help in identifying these vulnerabilities, having many different ways of code implementation increases risk of unidentified missing safeguards. Moreover, manual suppression of false positives in static and dynamic scan may introduce errors. Finally, it is difficult to maintain and update patterns of attack vectors if there is no central library for input validation and output encoding.

With the complexity of modern web applications, it is extremely difficult to prevent software vulnerabilities from being exploited. Even though every sizable organization and enterprise invests vast amount of resources in securing web applications, security vulnerabilities (or bugs) are still being exploited. Moreover, the fast pace at which web technologies and programming languages change makes it even harder for the defenders to catch up with the new attacks being developed by sophisticated hackers. As a result, in addition to the traditional focus on fixing software vulnerabilities via secure programming practice, attention has been shifting to detecting intrusion attempts.

While the development of intrusion detection techniques at the network layer has been the focus for many years, the battle field has been turning to the web layer but the approach adopted to detect web attacks still relies mostly on text-based pattern matching. For example, to detect a typical Cross-Site Scripting (XSS) attack, a standard set of pattern matching rules can be defined across the board to black list dangerous tags such as the case insensitive string "<Script," as well as all HTML event attributes like "onLoad=". However, if the application is printing tainted data from free text fields in JavaScript context, the pattern matching rules can be easily bypassed by writing JavaScript directly without using context switching control characters. Furthermore, depending on the implementation of JavaScript engines by different browser vendors, an advanced hacker is able to write malicious JavaScript using a small set of special characters only, without writing in normal JavaScript syntax. The approach is known as "obfuscation." As web applications nowadays make heavy use of dynamic JavaScript, there are essentially unlimited ways of writing an attack vector via different encoding techniques and obfuscation, if the application is vulnerable to JavaScript injection.

On the other hand, if a very stringent set of global pattern matching rules is applied, a huge volume of false positives will be generated, which can be manipulated by the attacker to embed a true attack within a large set of false alerts in order to reduce the chance of being detected. For example, an SQL injection attack payload may look like normal English usage, and a rule written with the purpose of catching obfuscated attacks would not be appropriate for free text fields accepting English sentences and paragraphs. Moreover, if a block decision is made based upon the detection rules, the required application functionalities will be broken.

In light of the various deficiencies and problems with prior approaches, there is a need for strengthened application security, for example, by imposing particular process guidelines on security requirements, secure coding practice as well as security testing. Apart from static analysis and dynamic test, there is also a need for secure architecture design as certain issues of application security can only be addressed through a secure architecture.

BRIEF DESCRIPTION OF THE DRAWINGS

The accompanying drawings and appendix, which are included to provide a further understanding of the invention and are incorporated in and constitute part of this specification, illustrate several embodiments of the invention and, together with the description, serve to explain the principles of the invention. The purpose and advantages of the present invention will be apparent to those of skill in the art from the following detailed description in conjunction with the appended drawings.

DETAILED DESCRIPTION OF THE INVENTION

Overview

Figure 1:
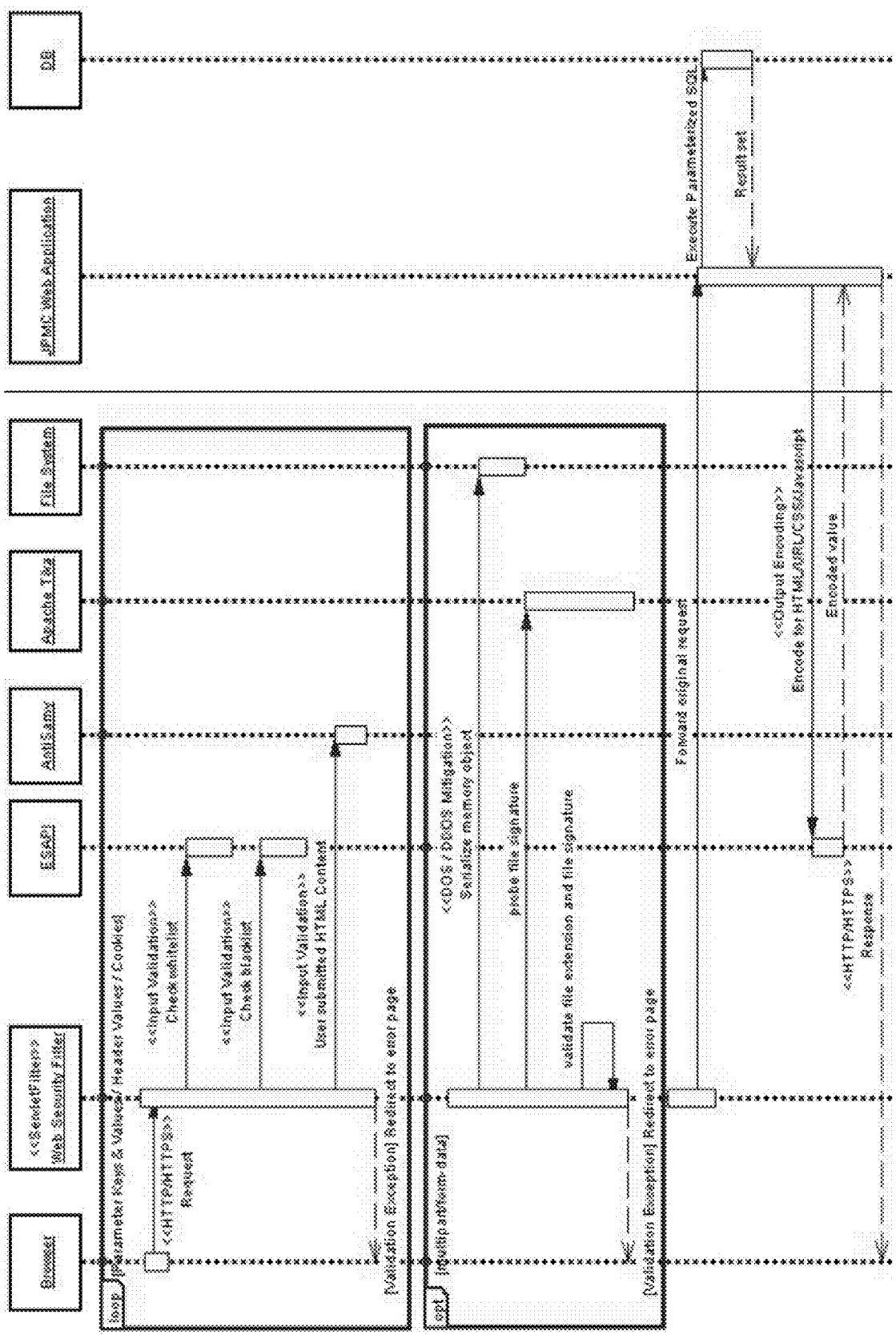
FIG. 1 is a block diagram illustrating an exemplary sequence for input validation and output encoding in accordance with one embodiment of the present invention.

Some embodiments of the present invention set forth a plurality of standards and implementation guidelines for cross-cutting security concerns of web applications (e.g., in an enterprise network), including but not limited to authentication and authorization, session management, communication channel security, input validation and output encoding, logging, and code obfuscation. With standard implementation based on the security methodologies described herein, application security level can be improved while minimizing architecture security assessment efforts. Other embodiments of the present invention set forth techniques for detecting web application attacks, by combining various data analytics techniques with traditional pattern matching to improve accuracy and reduce false positives. Rather than relying solely on heuristics, a data-centric approach may be taken to make classification decision based on difference in normal or expected data versus attack patterns. As will be described in more detail below, the STK threat detection can apply a cocktail approach to each individual application.

For example, as mentioned above, since software developers typically deal with each security threat by incorporating a corresponding set of code lines into individual web applications, the resulting code is often hard to maintain or modify. Accordingly, one aspect of the present invention addresses common security concerns in a standardized and holistic approach. All user requests for web applications are centralized to a single input and validated by a Web Security Filter. Selected layers of validation filters (e.g., ESAPI and AntiSamy) could be sequentially applied to the user requests, and those filters can be individually maintained and modified as discrete modules. Not only is this centralized, holistic approach to application security effective against a majority of malicious attacks, it is also saves a lot of time and costs in code development and maintenance.

Inventors of the present invention also recognize that secure architecture design should play an important role in application security. Secure architecture design could supplement secure coding techniques by adding security software features to controls already in place.

Embodiments of the present invention further recommend threat modeling as a method of architecture risk review, and rather than performing individual assessment on every possible design of security features such as authentication, authorization, and session management, implementation guidelines and recommendations are provided in order to better manage security requirements and reduce risk of unidentified vulnerabilities.

One goal of the present invention is to define the fundamental security requirements from an application architecture perspective. While the focus of the embodiments described herein is internal application development, many of the principles documented can be used for external applications as well.

Another goal of the present invention is to provide guidelines and recommendations that address the most common application development vulnerabilities and defects related to application security tasks such as session management, channel security, input validation, logging, and protection against reverse engineering.

More details of the present invention are described and illustrated below in connection with various aspects of application security. Additional disclosure of embodiments of the present invention can be found in the appendix attached hereto.

Input Validation and Output Encoding

According to embodiments of the present invention, it may be preferable that applications perform both Input Validation and Output Encoding to fully address vulnerabilities such as XSS and SQL injection. There may be two approaches to implement Input Validation and Output Encoding: (1) Using WebSecurityFilter in Security Toolkit library: This is the recommended approach because implementation effort is minimal and an application developer only need to implement output encoding while additional whitelists for input validation can also be defined by the developer according to the application needs. (2) Using ESAPI and AntiSamy: The application developer to implement both input validation and output encoding.

The Security Toolkit library mentioned above provides a module called Web Security Filter to transparently perform Input Validation by leveraging OWASP ESAPI and AntiSamy. Instead of calling ESAPI Validator methods and passing in regex at different lines of code scattered in a large number of source files, developers can define their regex as whitelist (which is the preferable option) and/or blacklist in a central policy file, and focus on telling the filter "what" to do by means of declaration without the need to bother "how" the required validation is done. The Web Security Filter may already come with a set of blacklists to provide baseline protection for common and certain advanced or obfuscated attacks, which are enabled by default for all HTTP headers/cookies/parameters. AntiSamy check may also be enabled by default and the validation will be performed automatically, reducing the burden on the developers to canonicalize input and call AntiSamy repeatedly.

An OWASP Enterprise Security API (ESAPI)—Validator and Encoder may be used for input validation and output encoding. To use ESAPI Validator, a regex has to be defined in easpi.properties or validation.properties file, and the name of the regex has to be passed to the ESAPI.validator( ).getValidInput call. For output encoding, both HtmlEncode and UrlEncode, well as other applicable encoding should be applied based on the output context. The following list contains the most commonly used ESAPI Encoder methods.

ESAPI.encoder( ).encodeForHTML
ESAPI.encoder( ).encodeForHTMLAttribute
ESAPI.encoder( ).encodeForJavaScript
ESAPI.encoder( ).encodeForVBScript
ESAPI.encoder( ).encodeForCSS
ESAPI.encoder( ).encodeForURL
ESAPI.encoder( ).encodeForXML
ESAPI.encoder( ).encodeForSQL
ESAPI.encoder( ).encodeForLDAP The OWASP ESAPI—Validator and Encoder is preferably used as a common library for input validation and output encoding on Java platform. Both HtmlEncode and UrlEncode may be applied according to use case. ASP.Net Validator Server Controls and HttpServerUtility.HtmlEncode/HttpServerUtility.UrlEncode are preferably used for .Net applications.

An OWASP AntiSamy scan function may perform validation and data cleansing on the data to prevent XSS issue.

AntiSamy relies on a policy file to define tags that would be accepted and the action to be taken on the listed tags. Apart from validating for XSS, it may also encode certain special characters if getCleanHTML ( ) is called. Data is canonicalized before passing to AntiSamy.

In order to prevent XSS, it is recommended not to insert untrusted data in the following locations, for example:
In HTML body or between HTML tags
In HTML tag name
In HTML attribute name and value
In HTML comment
Between SCRIPT tags
In JavaScript data value
Between CSS tags
In URL Output encoding is preferably not used alone as the only defense against XSS except in special circumstances. Input validation is preferably used together with output encoding. When output encoding is used, the following encoding rules are preferred based on how the data is handled by the client:
HTML entity encoding
HTML attribute encoding
URL encoding
JavaScript encoding
CSS Hex encoding The OWASP AntiSamy is preferred as a common library for XSS filtering. AntiSamy validates input against known XSS attack according to rules defined in policy file. The policy file may preferably be maintained and updated in a controlled manner according to latest XSS attack patterns and the needs of the application. Currently five standard policy files are available from OWASP:
antisamy-anythinggoes-x.x.x.xml
antisamy-ebay-x.x.x.xml
antisamy-myspace-x.x.x.xml
antisamy-slashdot-x.x.x.xml
antisamy-tinymce-x.x.x.xml
where x.x.x is the version number.

Selection of policy file is preferably made by considering the risk and type of input that the application must accept. It is more desirable to choose the policy file that allows the minimum set of markup language elements. The "antisamy-anythinggoes-x.x.x.xml" is preferably avoided.

In particular, FIG. 1 shows a block diagram illustrating an exemplary sequence for input validation and output encoding in accordance with one embodiment of the present invention. The sequence diagram illustrates a Web Security Filter at work in Java web applications. For input validation of HTTP request parameters, a Web Security Filter may be implemented in the form of one or more servlet filters that can be configured to examine HTTP requests by matching a particular pattern, by applying pre-defined validation rules, and/or by using whitelist and/or blacklist. All HTTP/HTTPS requests to web applications may be forced to go through this Web Security Filter (e.g., implemented as a security appliance in software and/or hardware) and undergo a uniform set of screening or examination procedures. A lot of flexibilities and efficiencies can also be achieved with this particular approach. For example, the number and type of servlet filters used to screen/examine the incoming requests may be individually modified and/or configured. For each evolving type of network threat, the corresponding servlet filter can be separately updated and then reused in a consistent manner against all incoming requests.

By adopting this Web Security Filter (leveraging the virtual patch concept), no code change is required to perform input validation on HTTP request parameters, but validation of input from other sources (e.g., configuration files, databases, network connections) may still requires calling ESAPI validator methods in application code. According to some embodiments of the present invention, only input validation is performed by the filter, and the application developer should implement output encoding by calling ESAPI encoder methods in application code.

At this point, those skilled in the art should appreciate that the security principles and methodologies disclosed herein may be applied to various types of applications, though actual implementation might vary with programming languages, frameworks, platforms, and other technical factors.

Advantages Over Conventional Approaches

A notable innovation here is that the Web Security Filter is able to chain together multiple security controls (e.g., input validation, DDOS mitigation, input sanitation) from a single filter which can be inserted strategically into the application, such that all inputs, valid or malicious, flow through one central point. The Web Security Filter then applies the security controls to, for example, three parts of the input stream received from every Web Application (i.e., Header, Cookies, and Body (input parameters which are key/value pairs of information processed by application—for example: name=Ainsley)).

Compared to conventional remediation approach and other available solutions like ModSecurity and network WAF, the Web Security Filter embodiments of the present invention are advantageous in a number of aspects.

To apply security controls at the Application layer, security checks can be distributed by delegating to application process, where each application may load its own instance of the Web Security Filter with its own set of rules. The Web Security Filter instances can be deployed or removed along with application package, preventing application rules from interfering with each other. Furthermore, the Web Security Filter is run as an application thread, avoiding network routing bypass as there is no separate tier.

In addition, since application developers can manage flexible grouping of multiple whitelist/blacklist validation rule sets based on application parameters, they could achieve specific customization of security filtering to support custom business requirements.

The Web Security Filter incorporated in an application could also provide a fail-safe or fail-secure design as the application will fail to start if it fails to load the filter. Such security implementation can be adopted as a default design by validating all parameters, so that explicit exclusion is required to skip validation. Embodiments of the present invention further supports a standard logging feed to log mining or other anomalies detected by the Web Security Filter.

STK Threat Detection

As described above, an umbrella of Java and .Net libraries, sometimes referred to as the "Security Toolkit" (STK), may be designed for software developers to defend against common web application vulnerabilities. At the same time, the STK may provide particular threat detection capabilities to identify intrusion attempts through the web channel. Embodiments of the STK Threat Detection tool described herein may improve the accuracy in detecting sophisticated web attacks in relation to untrusted data flows.

The STK Threat Detection tool addresses the above-described challenges in existing intrusion-detection approaches by using a combination of different approaches, including but not limited to standard text-based pattern matching, application-specific pattern matching, file upload header and extension check, statistical modeling and machine learning, through which the accuracy of detection can be improved with reduced false positives.

For example, the STK Threat Detection tool may make use of Java Servlet filter or .Net HttpModule embedded within a Java EE or .Net web application to intercept all HTTP/HTTPS requests passed to the application. All header, body and cookie fields as well as parameter keys and values in the incoming requests will be examined for suspicious data, and detected intrusion attempts will be blocked and/or logged, depending on policy configurations.

According to some embodiments of the present invention, multiple passes of threat detection or filtering may be applied.

Figure 2:
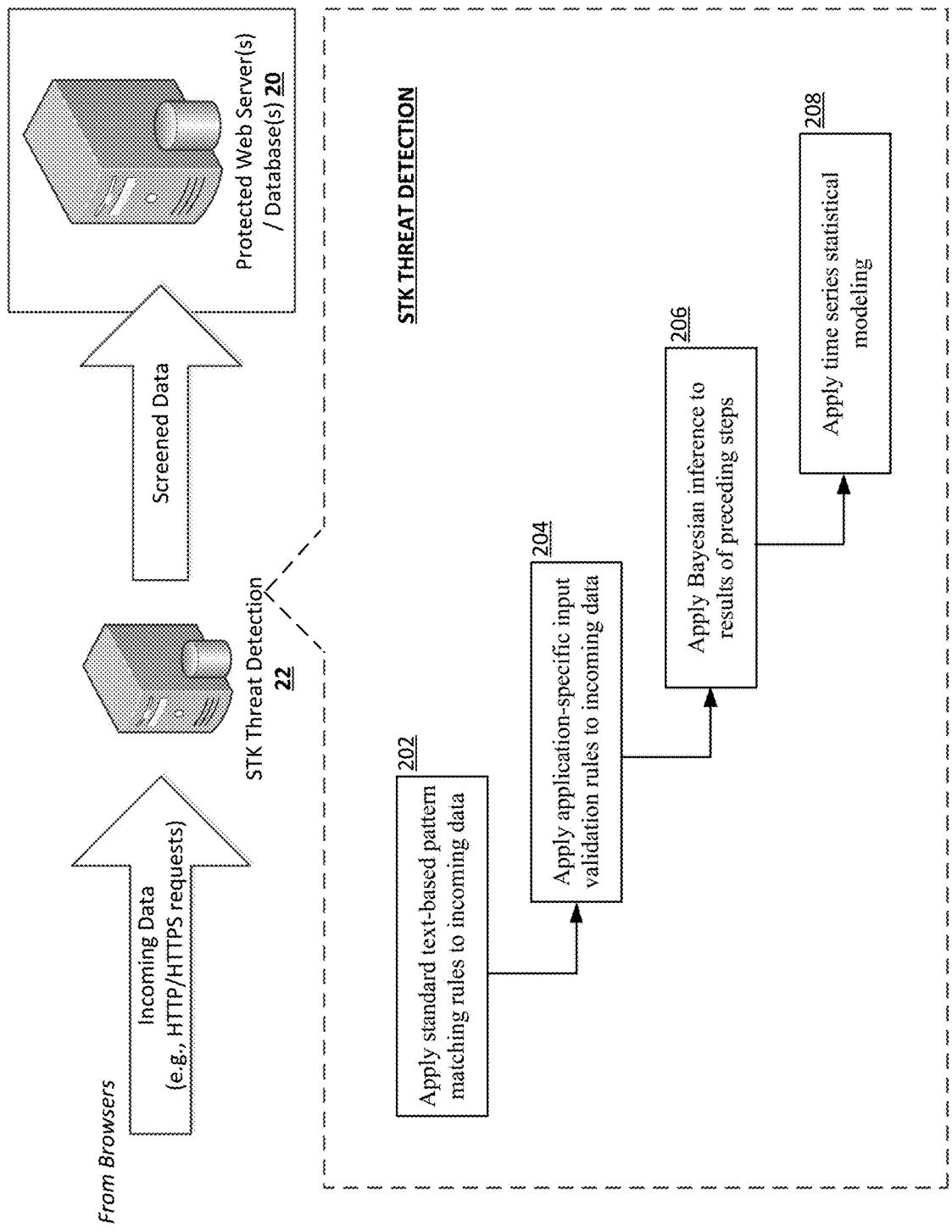
FIG. 2 shows a flow chart illustrating an exemplary process for threat detection according to one embodiment of the present invention.

FIG. 2 shows a flow chart illustrating an exemplary process for threat detection according to one embodiment of the present invention. In this example, an STK Threat Detection tool 22 intercepts and screens incoming data, such as HTTP and HTTPS requests, before allowing the screened data to reach Protected Web Server(s) or Database(s) 20.

In the first pass of threat detection (Step 202), a set of standard text-based pattern matching rules may be applied to each field in the incoming data under examination in order to identify intrusion attempts with a high degree of similarity to known attack patterns. For file upload requests, the file type may be checked against a list of acceptable file formats and a list of disallowed formats based on both file header and extension defined for known file types in the STK system properties. File content may also be checked with a set of pattern matching rules. If the incoming data matches the standard matching rules, it will be blocked.

In the second pass (Step 204), a set of application-specific input validation rules that are defined by the developers and a set of approximate pattern matching rules may be applied to the incoming data. The approximate matching ruleset is designed to be very stringent in nature and covers a broad range of suspicious patterns. The resultant set (i.e., data matching the approximate matching rules) may be fed to a security data analytics engine to further reduce to final results.

Through machine learning, the security data analytics engine may narrow down the results from the previous step by applying Bayesian inference (or other algorithm(s)) to the input set (Step 206). A probability score can be calculated to categorize the data according to a binary classification scheme: normal versus attack.

In addition to the machine learning algorithm, the security data analytics engine may apply statistical analysis of variance in the character distribution compared to normal requests, and a confidence level may be assigned to the final classification result.

Finally (in Step 208), time series statistical modeling may be applied to the number of responses returned by the web application or server over regular time intervals, grouped by HTTP response code. The number of responses may be compared to historical records for each response code using ARIMA (Auto-Regression Integrated Moving Average) to identify traffic anomaly.

Figure 3:
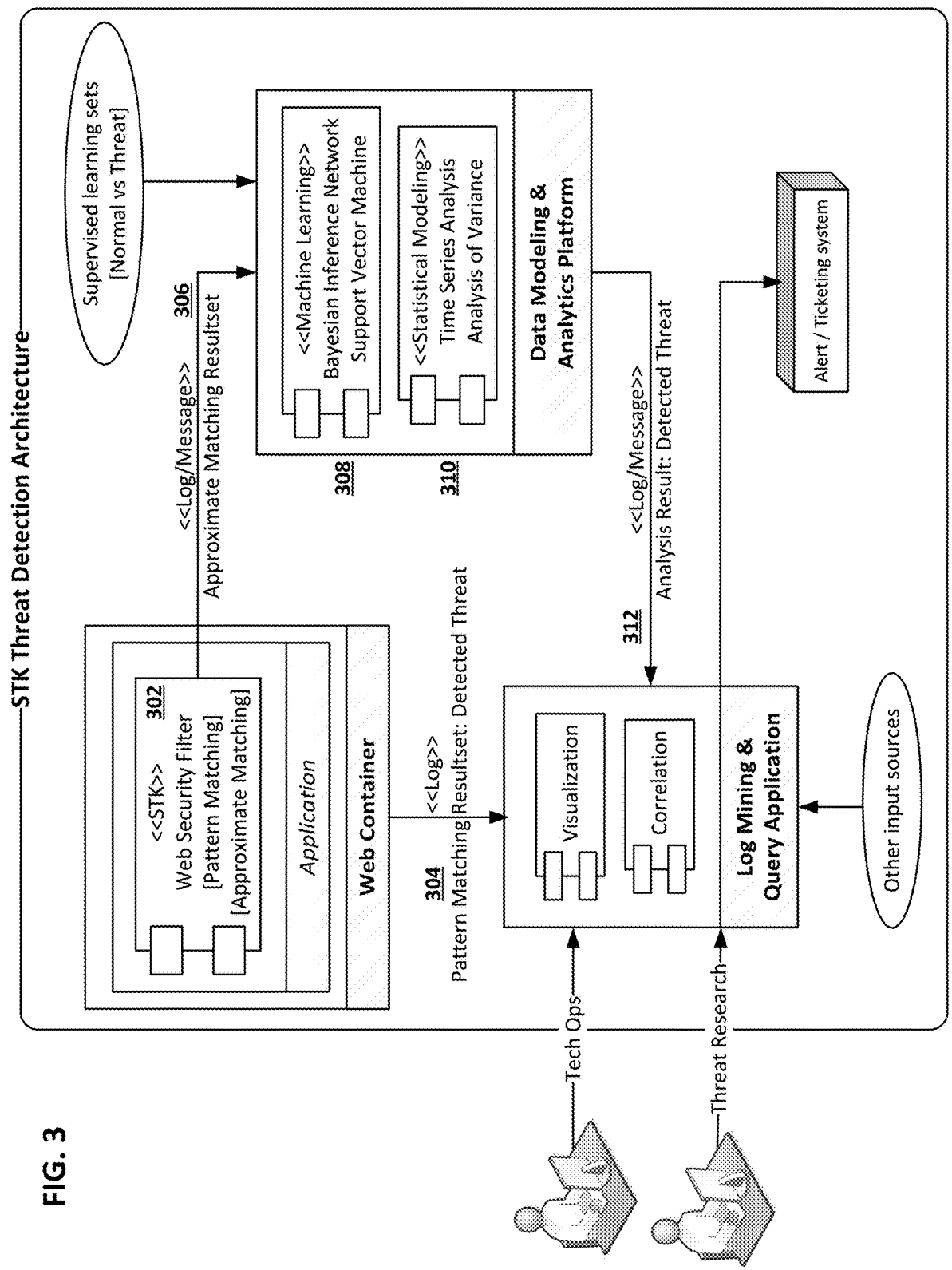
FIG. 3 illustrates an exemplary threat detection architecture according to some embodiments of the present invention.

FIG. 3 illustrates an exemplary threat detection architecture according to some embodiments of the present invention.

More particularly, the STK Threat Detection may rely on the STK Web Security Filter (302), which serves as an HTTP/HTTPS request interceptor within a standard Java EE and .Net architecture, to capture web traffic directed towards the protected web application.

The STK Web Security Filter may be derived from the "Intercepting Validator" design pattern to cleanse and validate data prior to its use by the application, and abstracts the validation logic from the actual validation. The validation logic may be implemented as a rule engine, and the rules may be defined in an XML formatted policy configuration file. The rules may also be defined as multiple sets of blacklists and whitelists using regular expressions (regex). Based on the configuration, the rules may be applied against specified HTTP request fields including HTTP/HTTPS headers, body and cookies, as well as parameter keys and values. Apart from the regular expression rules, there are specific validation checks for XSS and JSON data.

The input data may be normalized or canonicalized (e.g., by recursively decoding the data to its original form) before feeding into the rule engine and all single and multiline comment text for common programming and scripting languages will be removed before any validation occurs.

Under the rule pack section of the policy configuration, multiple sets of rules can be defined. According to one embodiment of the present invention, each ruleset node may contain the following elements:
1) an ID representing the ruleset;
2) the path in the form of URL against which the validation scan executes, with support of regex in definition;
3) the headers, cookies, and parameter keys and values for both GET and POST requests to be scanned, with support of alias and regex in definition;
4) a flag to indicate whether XSS filter should be applied using "AntiSamy" in the validation scan, defined as true or false;
5) a flag to indicate whether JSON validation/sanitization should be applied to JSON data format and structure in the request body and the specified fields of parameter values, defined as true or false, where an action is defined to block violation or encode the data;
6) a path pointing to a JSON schema definition for schema validation;
7) a message for validation exception to be used in logging;
8) a set of whitelists to define acceptable text patterns using regex, match any to pass; and
9) a set of blacklists to define disallowed text patterns using regex, match none to pass.

By default, a set of known attack patterns may be defined in the policy file(s) for the following exemplary categories of vulnerabilities:
a) XSS
b) Obfuscated XSS
c) SQL injection
d) Advanced SQL injection
e) Blind SQL injection
f) Script injection
g) Code injection
h) Command injection
i) Path manipulation/directory traversal
j) HTTP response splitting At or around the same time, application-specific rules defined by developers may be applied to identify non-legitimate data. On the other hand, open redirect rules set up via whitelisting URL patterns by developers, if any, may be applied as well. If multipart/form-data request is detected, the HTTP/HTTPS request is considered a file upload request, and the file type of the data being uploaded may be checked against a whitelist and a blacklist defined for both file header and extension in the system properties, in addition to regular rule matching against the file content.

The incoming request data must pass all checks at the Pattern Matching stage. Any security exception representing a failed validation results in the request being blocked and logged for threat detection reporting (304).

Apart from rules for known attack patterns, an additional set of rules are defined for pre-screening data that possesses language structure resembling the syntax of an attack string. This set of rules do not attempt to match the data with accurate attack patterns, but instead use Approximate Matching to rule out data that is very unlikely to be an attack. The filtered dataset is then fed to a security data analytics engine for further analysis (306). According to some embodiments of the present invention, the approximate match may implemented using regular expression, which matches a broad range of character strings.

The security data analytics engine applies Bayesian inference as an exemplary algorithm of binary classification of data (308), by which the input is classified as either "normal" or "attack." By adopting a machines learning approach, the Bayesian network may be trained with a set of normal data for each data field expected by the application being protected as well as a set of attack data designed by security experts and collected from security tools. Based on the occurrence frequencies of n-grams in the input sequence and the base rates, the algorithm calculates a probability score for the likelihood of the input belonging to each classification group, and suggests the appropriate category for the input.

According to some embodiments, to supplement the Bayesian classification, statistical analysis of variance may be performed to calculate the deviation in character distribution of the input compared to normal message samples. The frequencies of different character classes (e.g., alpha, numeric, special characters), the length of the messages, and the number of words between n-grams defined in the approximate matching rules may be calculated and normalized in order to identify anomalies in the input data.

Finally, in order to correlate detected intrusion attempts to typical multi-stage attack process, time series statistical modeling may be applied to analyze traffic that may indicate early probes for target resources in the initial stage of an attack (310). The number of responses over regular time intervals is modeled using ARIMA based on the HTTP response codes returned, and the actual figure for each time period, grouped by HTTP response code, is compared to the forecasted plot based on historical trend over time with automatic seasonal adjustment. Anomaly that falls outside a particular confidence interval may be flagged automatically. The analysis may also flag potential DoS/DDoS, fuzzing or brute force attack, and scanner activities targeting the web server and application layer.

Based on the outcomes of the various analyses, the final threat detection result may be rated and ranked with a confidence level (312), such as "Very High," "High," "Medium," or "Low." And, the final result may cause alerts and/or IT follow-up tickets to be generated.

According to one further embodiment of the present invention, the WebSecurityFilter may be configured to automatically detect if the physical geolocation of a client has changed abnormally for an authenticated user. WebSecurityFilter may collect all clients' real source IP addresses via the "X-Forwarded-For" (XFF) HTTP header in addition to the originating IP address of the directly connecting hop. The geolocation (e.g., in terms of latitude and longitude) of the originating client may be looked up in a GeoIP database, which can be updated independently and regularly. At the same time, the STK may provide a set of standard application-logging APIs for logging salted hashed usernames authenticated to the application. According to one embodiment, original usernames will not be used for privacy protection. By combining GeoIP lookup with logging, the great-circle distance between the current and the previous geo-locations originating from the same user may be calculated using the Haversine formula, and the distance may be divided by the time logged between the pair of authenticated HTTP requests. The calculated speed is compared to a threshold indicating acceptable travelling speed taking into account transportation means and waiting time, for example. If the calculated speed is smaller than the threshold, the current geo-location captured may be translated into an address indicating the coarse location of the user, with configurable level of detail (e.g. city), and STK may further search for the coarse location in the user's previous access records within a pre-configured period of time. If the location is not found in the user's history, an alert will be generated for anomaly. The process may run at regular intervals to serve as a detective control.

According to another embodiment of the present invention, the WebSecurityFilter may be configured to detect session ID theft by checking if the same session ID is found associated with two different device fingerprints in subsequent requests, and, if so, to send out an alert and/or the request will be blocked. The session ID passed via HTTP cookie can be correlated with the device fingerprint derived from a collection of browser properties of the client's device or machine. A device fingerprinting JavaScript may be automatically inserted by the WebSecurityFilter in HTTP responses, and a hash of the fingerprint will be calculated for every request. The device fingerprint may be registered when a user is authenticated and a session ID is generated.

According to yet another embodiment of the present invention, the WebSecurityFilter may also be configured to automatically inject secure HTTP header values in all outbound responses. The protections may include, but not limited to, Header control (X-XSS-Protection, X-FRAME-OPTIONS, X-Content-Type-Options, no-cache), HTTP-Strict-Transport-Security, Content Security Policy, Certificate Pinning using HPKP, Cookie Domain/Path. The HTTP response header names and the accepted values can be defined in the WebSecurityFilter's policy file by configuration, and each header rule may be applied to a specific set of URLs defined by regex, with exception of URLs optionally defined by regex to be excluded from the rule. At the same time, "Secure" and "HttpOnly" attributes of session cookies may be automatically enforced by configuration.

According to still another embodiment of the present invention, the STK may further include hardening of embedded Tomcat by programmatically configuring the behavior of the container via Spring Boot APIs. The implementation may include HTTP verbs restriction, TLS/SSL and cipher suite configurations.

According to an additional embodiment of the present invention, the STK may further include token generation library to generate WebSocket token using the platform's pseudorandom number generators or by hashing the session ID. The token may then be inserted into HTTP header, in addition to the "Origin" HTTP header used in WebSocket handshake, and validated at the application level.

Computer Implementation

The components used to implement embodiments of the present invention may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that embodiments of the present invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or non-volatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A plurality of software processing modules may be stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/non-volatile computer storage media. For example, a hard disk drive may read or write to non-removable, non-volatile magnetic media. A magnetic disk drive may read from or writes to a removable, non-volatile magnetic disk, and an optical disk drive may read from or write to a removable, non-volatile optical disk such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown or described here, those of ordinary skill in the art will appreciate that such components and the interconnections are well known. Accordingly, additional details concerning the internal construction of the computer need not be disclosed in connection with the present invention.

In operation, a computer processor or the like in a computer or server system may be configured with a special set of program instructions to automatically perform security filtering functions consistent with the methodology described above.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the patent claims ultimately issued from this application.

The invention claimed is:

1. A server system with a defense mechanism against security threats on application layer, comprising:
   at least one application server hosting one or more applications accessible to authorized users;
   a single communication interface to which all user requests to any of the hosted applications are routed; and
   a security appliance coupled to the single communication interface and configured to:
      receive the user requests, and
      screen each of the user requests with a selected set of discrete validation filters by sequentially applying the filters to each of the user requests, wherein one of the discrete validation filters applies one or more text-based pattern matching rules to each of the user requests and another one of the discrete validation filters applies application-specific input validation rules to each of the user requests;
   wherein each of the discrete validation filters are modularly configured to handle a corresponding security threat and being individually modifiable without affecting another validation filter corresponding to another security threat, and
   wherein when one of the user requests is a file upload request, the one of the discrete validation filters that applies the one or more text-based pattern matching rules checks a file type against a list of acceptable file formats and a list of disallowed formats based on both file header and extension.

2. The server system according to claim 1, wherein at least some of the user requests are HTTP or HTTPS requests.

3. The server system according to claim 1, wherein one of the selected set of discrete validation filters comprises at least one rule for input validation in connection with the one or more applications.

4. The server system according to claim 3, wherein the at least one rule for input validation is based on one or more whitelists of threat or attack patterns.

5. The server system according to claim 1, wherein one of the selected set of discrete validation filters comprises at least one rule for output encoding in connection with the one or more applications.

6. The server system according to claim 1, wherein one of the selected set of discrete validation filters comprises data cleansing.

7. A method for defending against security threats on application layer in a server system, the method comprising:
   intercepting all incoming HTTP or HTTPS requests directed to one or more applications hosted on a protected web server or database in a server system, and
   examining each of the incoming HTTP or HTTPS requests by sequentially:
      using at least a first one of a set of discrete validation filters to apply one or more text-based pattern matching rules to each of the incoming HTTP or HTTPS requests,
      using at least a second one of the set of discrete validation filters to apply application-specific input validation rules to each of the incoming HTTP or HTTPS requests; and
   forwarding, based on the examining, a screened subset of the incoming HTTP or HTTPS requests to the protected web server or database,
   wherein each of the discrete validation filters is modularly configured to handle a corresponding security threat and is individually modifiable without affecting another validation filter corresponding to another security threat, and
   wherein when one of the incoming HTTP or HTTPS requests is a file upload request, the applying the one or more text-based pattern matching rules includes checking a file type against a list of acceptable file formats and a list of disallowed formats based on both file header and extension.

8. The method of claim 7, further comprising:
   applying Bayesian inference to refine results of the application of the text-based pattern matching rules and the application of the application-specific input validation rules.

9. The method of claim 7, further comprising:
applying a time series statistical modeling to a group of responses returned by the protected web server or database over one or more predetermined time periods.

10. A non-transitory computer readable medium having stored thereon instructions for defending against security threats on application layer in a server system comprising machine executable code which when executed by a processor, causes the processor to:
  intercept all incoming HTTP or HTTPS requests directed to one or more applications hosted on a protected web server or database in a server system, and
  examine each of the incoming HTTP or HTTPS requests by sequentially:
    using at least a first one of a set of discrete validation filters to apply one or more text-based pattern matching rules to each of the incoming HTTP or HTTPS requests,
    using at least a second one of the set of discrete validation filters to apply application-specific input validation rules to each of the incoming HTTP or HTTPS requests; and
  forwarding, based on the examining, a screened subset of the incoming HTTP or HTTPS requests to the protected web server or database,
  wherein each of the discrete validation filters is modularly configured to handle a corresponding security threat and is individually modifiable without affecting another validation filter corresponding to another security threat, and
  wherein when one of the incoming HTTP or HTTPS requests is a file upload request, the applying the one or more text-based pattern matching rules includes checking a file type against a list of acceptable file formats and a list of disallowed formats based on both file header and extension.

11. The non-transitory computer readable medium of claim 10, wherein when executed by the processor, the processor is further configured to apply Bayesian inference to refine results of the application of the text-based pattern matching rules and the application of the application-specific input validation rules.

12. The non-transitory computer readable medium of claim 10, wherein when executed by the processor, the processor is further configured to apply a time series statistical modeling to a group of responses returned by the protected web server or database over one or more predetermined time periods.

* * * * *